United States Patent Office 3,360,572
Patented Dec. 26, 1967

3,360,572
OXIDATION OF BENZENE TO PHENOL
Charles M. Selwitz, Monroeville, Pa., assignor to Gulf Research & Development Company, Pittsburgh, Pa., a corporation of Delaware
No Drawing. Filed Dec. 22, 1964, Ser. No. 420,436
14 Claims. (Cl. 260—621)

ABSTRACT OF THE DISCLOSURE

Phenol is produced by oxidizing benzene with a gas containing molecular oxygen at a temperature between about 600° and 800° C. in the presence of water and HBr or a compound capable of resulting in the formation of HBr under reaction conditions.

This invention relates to a process for the oxidation of a benzene compound, particularly to a process for oxidizing a benzene compound to the corresponding phenolic compound with a compound containing molecular oxygen in the presence of water and a compound selected from the group consisting of HBr and compounds capable of resulting in the formation of HBr under the conditions of the reaction. Examples of compounds that can be oxidized include benzene itself and benzenes containing substituents, such as chloro, nitro, cyano, methoxy, etc. Of these, benzene is preferred as charge. Benzene will be converted primarily to phenol, with only small amounts of diphenyl. The remaining benzenes upon oxidation, in accordance with the defined procedure, will be converted to the corresponding phenol, with the substituent on the benzene charge being present in the phenol obtained.

Any gas containing molecular oxygen, including oxygen itself, can be employed in the oxidation process. The amount of oxygen required will be about 0.02 to about five mols per mol of said benzene compound, preferably from about 0.1 to about 1.0 mol per mol of said benzene compound. Oxygen below the defined amounts will result in no significant amounts of oxidation, while oxygen in amounts above the defined amounts tends to result in overoxidation of the aromatic charge.

To render the reaction selective toward formation of the desired phenol and to moderate the reaction, the same is carried out in the presence of a selected amount of water. The amount of water required will be from about 0.5 to about 50 mols per mol of said benzene compound, preferably from about two to about 20 mols per mol of said benzene compound.

In order to obtain excellent conversion of said benzene compound and excellent yields to the desired phenols, the reaction is carried out in the presence of HBr or compounds capable of resulting in the formation of HBr under the reaction conditions defined herein. I am of the opinion that the effective compound herein is HBr and that any compound that produces HBr under the conditions of the reaction can be employed. Compounds capable of resulting in the formation of HBr, as defined, include brominated hydrocarbons, such as 5-bromoacenaphthene, 9-bromoanthracene, 1-bromo-1-butene, (1-bromoethyl)benzene, (2-bromoethyl)benzene, 2-bromomesitylene, (3-bromopropyl)benzene, benzyl bromide, 3-bromobutene-1, 4-bromopentyne-2, alpha-bromo-orthoxylene, diphenylbromomethane, cyclopropylbromide, etc., particularly brominated paraffins, such as 2-bromobutane, bromocyclohexane, bromocyclopentane, 1-bromodecane, 3-bromodecane, bromoethane, bromoform, 1-bromoheptane, 3-bromohexane, 1-bromo-3-methylbutane, 3-(bromomethyl)heptane, 2-bromo-2-methylpropane, 1,1-dibromoethane, 1,2-dibromoethane, 1,2-dibromobutane, etc., and other organic bromine-containing compounds, such as aniline hydrobromide, bromoacetal, bromoacetanilide, bromoacetic acid, 2-bromoacetophenone, bromoacetylbromide, ortho-bromoaniline, para-bromoaniline hydrobromide, para-bromoanisole, bromobenzene, 3-bromo-2-butanone, 2-bromo-4-tertiary-butylphenol, 2-bromobutyric acid, 1-bromo-2-nitroethane, para-bromo-N,N-diethylaniline, 2-bromoethanol, 2-bromoethyl acetate, 2-bromoethylamine hydrobromide, 2-bromoethyl ethyl ether, 3-bromo-3-methylbutyric acid, etc. Preferred compounds are 2-bromo-2-methylpropane, 2-bromo-2-methylbutane, 1,2-dibromoethane, etc., and homologues thereof. Bromine itself or organic iodine-containing or organic chlorine-containing compounds are not suitable for purposes of the claimed process. The amount of HBr or compound capable of resulting in the formation of HBr required is at least about 0.0001 mol per mol of the benzene charge, preferably about 0.001 to about 0.20 mol per mol of the benzene charge.

The oxidation reaction defined herein must be carried out at a temperature in the range of about 600° to about 800° C., preferably in the range of about 650° to about 750° C. Below this temperature range no appreciable reaction occurs, whereas at temperatures above the defined range overoxidation resulting in the formation of unwanted compounds occurs. Pressure is not critical and can be, for example, from about one to about 100 pounds per square inch gauge, preferably from about 10 to about 20 pounds per square inch gauge.

Under the reaction conditions defined above, the reaction mixture is in the vapor phase and, accordingly, the reaction mixture is continuously passed through a reactor having a nonreactive surface toward the reaction, such as a calorized surface or a suitable ceramic surface. Space velocities (total volume of vapor per volume of reactor per hour) of about 100 to about 10,000, preferably about 1000 to about 5000 are maintained.

Upon completion of the reaction, the reaction mixture is cooled to a suitable low temperature at which further reaction essentially ceases, for example, a temperature of about 0° to about 70° C., preferably about 20° to about 30° C., and recovery of the desired phenol therefrom is effected in any suitable manner. Thus, in the case wherein benzene has been converted to phenol, the reaction mixture resolves itself into an upper organic or benzene phase and a lower or aqueous phase. The two phases are separated from each other in any suitable manner, for example, by decantation, and the aqueous phase is extracted with benzene to remove phenol therefrom. The latter extract is combined with the separated organic or benzene phase and the total is subjected to suitable distillation procedures to remove benzene therefrom. The remainder can be subjected to further distillation to recover the desired phenol. The aqueous phase previously recovered from the reaction product contains dissolved therein the hydrogen bromide present in the reaction zone. In a preferred embodiment, the aqueous phase and the recovered benzene can be recycled to the reaction zone.

The process defined herein can further be illustrated by the following:

Example I

Into a calorized reactor (one containing an aluminum oxide internal surface) 24 inches high and an internal diameter of one inch, and which was maintained at atmospheric pressure, there was continuously introduced water vapor, benzene vapor, an organic bromide in vapor form and oxygen. The reaction product obtained was cooled to 23° C. and the phenol therein was recovered by extraction and distillation as previously defined. The results are tabulated below in Table I.

TABLE I

| Run No. | 1 | 2 | 3 | 4 | 5 | 6 | 7 | 8 | 9 | 10 | 11 | 12 |
|---|---|---|---|---|---|---|---|---|---|---|---|---|
| Catalyst | D1B | D1B | D1B | D1B | D1B | D1B | D1B | D1B | tAB | tBB | tBB | tBB |
| Mols Per Hour of Catalyst | 0.0043 | 0.0056 | 0.0054 | 0.0058 | 0.0039 | 0.0043 | 0.0045 | 0.0018 | 0.0044 | 0.0053 | 0.0027 | 0.0013 |
| Water, Mols Per Hour | 10.2 | 18.7 | 16.5 | 17.3 | 8.5 | 10.3 | 10.3 | 4.4 | 9.7 | 10.0 | 5.1 | 5.3 |
| Benzene, Mols Per Hour | 1.0 | .35 | 1.3 | 1.4 | 0.94 | 1.01 | 1.08 | 0.44 | 0.86 | 0.93 | 0.47 | 0.45 |
| Oxygen, Mols Per Hour | 0.45 | 0.60 | 0.60 | 0.60 | 0.41 | 0.41 | 0.41 | 0.21 | 0.41 | 0.41 | 0.21 | 0.21 |
| Average Temperature, °C | 673 | 687 | 739 | 722 | 691 | 714 | 716 | 692 | 690 | 693 | 691 | 690 |
| Highest Temperature, °C | 682 | 698 | 747 | 733 | 701 | 722 | 724 | 701 | 699 | 706 | 700 | 701 |
| Space Velocity (Volume of Vapor Per Volume of Reactor Per Hour) | 2,750 | 4,830 | 4,640 | 4,780 | 2,360 | 2,890 | 2,920 | 1,210 | 2,600 | 2,730 | 1,400 | 1,400 |
| Conversion, Percent | 11.2 | 7.5 | 15.9 | 8.4 | 10.6 | 9.0 | 11.0 | 21.6 | 18.3 | 18.5 | 25.0 | 13.1 |
| Molar Efficiency, Percent | 40 | 62 | 40 | 61 | 71 | 81 | 75 | 40 | 44 | 40 | 36 | 60 |

D1B=1,2-dibromoethane; tAB=tertiary amyl bromide; tBB=tertiary butyl bromide.

The data in Table I show that the use of 1,2-dibromoethane, tertiary amyl bromide and tertiary butyl bromide in the claimed process resulted in a molar efficiency of benzene to phenol as high as 81 percent. Even at relatively high conversion of benzene selectivity to phenol was excellent. The remaining products obtained in the reaction included biphenyl, carbon dioxide and carbon monoxide.

*Example II*

Additional runs were made in the same reactor as that employed in Example I. In this instance, however, HBr was employed in place of alkyl bromides employed in Example I. The results obtained are summarized below in Table II and show that HBr is an effective catalyst in the defined process. In addition to phenol, the following compounds were also obtained: biphenyl, carbon monoxide and carbon dioxide.

*Example III*

Under the conditions described in Example I, the oxidation of toluene was carried out by replacing benzene with toluene. The results are summarized below in Table III. It can be seen from the data therein that the process defined herein is specific to benzene and cannot effectively be applied to toluene.

TABLE III

| Run No. | 23 | 24 | 25 | 26 | 27 | 28 |
|---|---|---|---|---|---|---|
| Catalyst | None | None | None | None | 1,2-dibromoethane | |
| Moles Per Hour of Catalyst | 0 | 0 | 0 | 0 | 0.0020 | 0.0033 |
| Water, Mols Per Hour | 5.8 | 7.85 | 5.5 | 5.5 | 7.0 | 5.5 |
| Toluene, Mols Per Hour | 1.2 | 1.23 | 0.5 | 0.5 | 0.5 | 0.84 |
| Oxygen, Mols Per Hour | 0.56 | 1.34 | 0.5 | 0.5 | 0.5 | 0.50 |
| Average Temperature, °C | 735 | 704 | 735 | 760 | 764 | 758 |
| Highest Temperature, °C | 741 | 826 | 749 | 793 | 780 | 788 |
| Space Velocity (Volume of Vapor Per Volume of Reactor Per Hour) | 1,917 | 2,540 | 1,638 | 1,680 | 2,067 | 1,770 |
| Conversion, Percent | 10.0 | 31.0 | 22 | 22 | 19 | 12.1 |
| Molar Efficiency, Percent to— | | | | | | |
| Phenol | 8.3 | 9.1 | 5.5 | 5.7 | 5.5 | 12.3 |
| Cresols | 8.9 | 6.4 | 4.8 | 4.6 | 4.9 | 11.3 |
| Para Benzoquinone | 2.4 | 15.0 | 20.0 | | | |
| Bitolyls | 14.0 | 6.7 | 8.0 | | | |

*Example IV*

In order to show the advantageous effect of an alkyl bromide in the claimed procedure, two additional sets of runs were made at different temperature levels, in each set of which one run was made in the presence of a small amount of 1,2-dibromoethane and one run was not. As the data in Table IV below illustrate, the presence of 1,2-dibromoethane in the reaction system was required at the lower temperature to obtain conversion of benzene to phenol, while at the higher temperature level the conversion was essentially doubled when 1,2-dibromoethane was present and the molar efficiency to phenol was improved.

TABLE II

| Run No. | 13 | 14 | 15 | 16 | 17 | 18 | 19 | 20 | 21 | 22 |
|---|---|---|---|---|---|---|---|---|---|---|
| Mols Per Hour of HBr | 0.0103 | 0.0107 | 0.0064 | 0.0083 | 0.0069 | 0.0029 | 0.0144 | 0.0115 | 0.0049 | 0.0138 |
| Water, Mols Per Hour | 9.3 | 9.6 | 5.8 | 7.5 | 6.2 | 6.4 | 6.4 | 8.6 | 3.7 | 6.2 |
| Benzene, Mols Per Hour | 0.86 | 0.84 | 0.89 | 0.85 | 0.86 | 0.86 | 0.87 | 1.10 | 0.90 | 0.87 |
| Oxygen, Mols Per Hour | 0.45 | 0.45 | 0.45 | 0.66 | 0.45 | 0.45 | 0.45 | 0.36 | 0.59 | 0.45 |
| Average Temperature, °C | 708 | 685 | 687 | 672 | 679 | 682 | 650 | 711 | 670 | 683 |
| Highest Temperature, °C | 715 | 689 | 697 | 676 | 684 | 684 | 653 | 715 | 680 | 685 |
| Space Velocity (Volume of Vapor Per Volume of Reactor Per Hour) | 2,600 | 2,640 | 1,700 | 2,125 | 1,780 | 1,837 | 1,777 | 2,608 | 1,225 | 1,744 |
| Conversion, Percent | 12.4 | 9.7 | 14.3 | 19.6 | 15.4 | 19.0 | 9.0 | 10.6 | 16.9 | 14.3 |
| Molar Efficiency, Percent | 45.0 | 34.4 | 49.2 | 35.1 | 51.0 | 50.0 | 49.1 | 44.4 | 46.4 | 39.0 |

TABLE IV

| Run No | 29 | 30 | 31 | 32 |
|---|---|---|---|---|
| Mols Per Hour of 1,2-dibromoethane | None | 0.0033 | None | 0.0037 |
| Water, Mols Per Hour | 8.4 | 7.9 | 7.5 | 6.26 |
| Benzene, Mols Per Hour | 0.884 | 0.880 | 0.933 | 0.919 |
| Oxygen, Mols Per Hour | 0.44 | 0.44 | 0.46 | 0.46 |
| Average Temperature, °C | 738 | 729 | 678 | 681 |
| Highest Temperature, °C | 744 | 733 | 683 | 686 |
| Space Velocity (Volume of Vapor Per Volume of Reactor Per Hour) | 2,460 | 2,340 | 2,117 | 1,830 |
| Conversion, Percent | 10.2 | 20.9 | (¹) | 20.7 |
| Molar Efficiency, Percent | 31.9 | 40.8 | | 50.0 |

¹ No conversion.

*Example V*

That other alkyl halides and elemental bromine are not effective in the process defined and claimed herein is apparent from an additional series of runs made in accordance with the above and whose data are recorded below in Table V.

TABLE V

| Run No | 27 | 28 | 29 | 30 |
|---|---|---|---|---|
| Catalyst | (¹) | (¹) | (²) | (³) |
| Mols Per Hour of Catalyst | 0.0042 | 0.0042 | 0.0047 | 0.0023 |
| Water, Mols Per Hour | 5.0 | 5.0 | 5.0 | 8.3 |
| Benzene, Mols Per Hour | 0.5 | 0.5 | 0.5 | 0.95 |
| Oxygen, Mols Per Hour | 0.25 | 0.25 | 0.25 | 0.47 |
| Average Temperature, °C | 690 | 730 | 690 | 685 |
| Highest Temperature, °C | (⁴) | (⁴) | 700 | 693 |
| Space Velocity (Volume of Vapor Per Volume of Reactor Per Hour) | 1,390 | 1,440 | 1,390 | 2,322 |
| Conversion, Percent | 4 | 15 | 16 | (⁵) |
| Molar Efficiency, Percent | 38 | 16 | 16 | (⁶) |

¹ Tertiary butyl chloride.
² 1-iodopropane.
³ Elemental bromine.
⁴ Not taken.
⁵ Not determined.
⁶ Negligible.

Obviously, many modifications and variations of the invention, as hereinabove set forth, can be made without departing from the spirit and scope thereof, and therefore only such limitations should be made as are indicated in the appended claims.

I claim:

1. A process for oxidizing benzene to phenol which comprises contacting at a temperature of about 600° to about 800° C. in the vapor phase benzene with a gas containing molecular oxygen, the amount of said oxygen containing gas being sufficient to provide from about 0.02 to about 5 mols of oxygen per mol of said benzene compound, in the presence of about 0.05 to about 50 mols of water per mol of benzene and at least about 0.0001 mol of a compound selected from the group consisting of HBr and a compound capable of resulting in the formation of HBr.

2. A process for oxidizing benzene to phenol which comprises contacting at a temperature of about 600° to about 800° C. in the vapor phase benzene with a gas containing molecular oxygen, the amount of said oxygen containing gas being sufficient to provide from about 0.02 to about 5 mols of oxygen per mol of said benzene compound, in the presence of about 0.05 to about 50 mols of water per mol of benzene and at least about 0.0001 mol of HBr.

3. A process for oxidizing benzene to phenol which comprises contacting at a temperature of about 600° to about 800° C. in the vapor phase benzene with a gas containing molecular oxygen, the amount of said oxygen containing gas being sufficient to provide from about 0.02 to about 5 mols of oxygen per mol of said benzene compound, in the presence of about 0.05 to about 50 mols of water per mol of benzene and at least about 0.0001 mol of a compound capable of resulting in the formation of HBr.

4. A process for oxidizing benzene to phenol which comprises contacting at a temperature of about 600° to about 800° C. in the vapor phase benzene with a gas containing molecular oxygen, the amount of said oxygen containing gas being sufficient to provide from about 0.02 to about 5 mols of oxygen per mol of said benzene compound, in the presence of about 0.05 to about 50 mols of water per mol of benzene and at least about 0.0001 mol of an alkyl bromide.

5. A process according to claim 4 wherein the alkyl bromide is 1,2-dibromoethane.

6. A process according to claim 4 wherein the alkyl bromide is tertiary butyl bromide.

7. A process according to claim 4 wherein the alkyl bromide is tertiary amyl bromide.

8. A process for oxidizing benzene to phenol which comprises reacting in the vapor phase at a temperature of about 600° to about 800° C. benzene with about 0.02 to about five mols thereof of oxygen in the presence of about 0.5 to about 50 mols thereof of water and about 0.0001 to about 0.20 mol thereof of a compound selected from the group consisting of HBr and a compound capable of resulting in the formation of HBr.

9. A process for oxidizing benzene to phenol which comprises reacting in the vapor phase at a temperature of about 600° to about 800° C. benzene with about 0.02 to about five mols thereof of oxygen in the presence of about 0.5 to about 50 mols thereof of water and about 0.0001 to about 0.20 mol thereof of HBr.

10. A process for oxidizing benzene to phenol which comprises reacting in the vapor phase at a temperature of about 600° to about 800° C. benzene with about 0.02 to about five mols thereof of oxygen in the presence of about 0.5 to about 50 mols thereof of water and about 0.0001 to about 0.20 mol thereof of a compound capable of resulting in the formation of HBr.

11. A process for oxidizing benzene to phenol which comprises reacting in the vapor phase at a temperature of about 600° to about 800° C. benzene with about 0.02 to about five mols thereof of oxygen in the presence of about 0.5 to about 50 mols thereof of water and about 0.0001 to about 0.20 mol thereof of an alkyl bromide.

12. A process for oxidizing benzene to phenol which comprises reacting in the vapor phase at a temperature of about 600° to about 800° C. benzene with about 0.02 to about five mols thereof of oxygen in the presence of about 0.5 to about 50 mols thereof of water and about 0.0001 to about 0.20 mol thereof of 1,2-dibromoethane.

13. A process for oxidizing benzene to phenol which comprises reacting in the vapor phase at a temperature of about 600° to about 800° C. benzene with about 0.02 to about five mols thereof of oxygen in the presence of about 0.5 to about 50 mols thereof of water and about 0.0001 to about 0.20 mol thereof of tertiary butyl bromide.

14. A process for oxidizing benzene to phenol which comprises reacting in the vapor phase at a temperature of about 600° to about 800° C. benzene with about 0.02 to about five mols thereof of oxygen in the presence of about 0.5 to about 50 mols thereof of water and about 0.0001 to about 0.20 mol thereof of tertiary amyl bromide.

References Cited

UNITED STATES PATENTS 2,382,148  8/1945  Harman _____ 260—621
2,415,800  2/1947  Rust et al. _____ 260—619

OTHER REFERENCES

Barnett et al. Oxidations of Aromatic Compounds, Ind. and Eng. Chem. 41(11); pp. 2612–15, November 1949.

LEON ZITVER, *Primary Examiner.*

H. ROBERTS, *Assistant Examiner.*

UNITED STATES PATENT OFFICE
CERTIFICATE OF CORRECTION

Patent No. 3,360,572                          December 26, 1967

Charles M. Selwitz

It is hereby certified that error appears in the above numbered patent requiring correction and that the said Letters Patent should read as corrected below.

Columns 3 and 4, TABLE I, third column, line 4 thereof, for ".35" read -- 1.35 --.

Signed and sealed this 21st day of January 1969.

(SEAL)
Attest:

Edward M. Fletcher, Jr.                     EDWARD J. BRENNER
Attesting Officer                              Commissioner of Patents